United States Patent
VanBlon et al.

(10) Patent No.: US 10,475,397 B2
(45) Date of Patent: Nov. 12, 2019

(54) SYSTEMS AND METHODS FOR DETERMINING WHETHER TO PRESENT CONTENT USING ELECTRONIC PAPER DISPLAY

(71) Applicant: Lenovo (Singapore) Pte. Ltd., New Tech Park (SG)

(72) Inventors: Russell Speight VanBlon, Raleigh, NC (US); Robert James Kapinos, Durham, NC (US); Scott Wentao Li, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/187,253

(22) Filed: Jun. 20, 2016

(65) Prior Publication Data
US 2017/0365223 A1 Dec. 21, 2017

(51) Int. Cl.
G09G 3/34 (2006.01)
G06F 3/0346 (2013.01)
G09G 5/36 (2006.01)

(52) U.S. Cl.
CPC .......... *G09G 3/344* (2013.01); *G06F 3/0346* (2013.01); *G09G 3/342* (2013.01); *G09G 3/3406* (2013.01); *G09G 3/3413* (2013.01); *G09G 5/36* (2013.01); *G09G 2300/023* (2013.01); *G09G 2320/103* (2013.01); *G09G 2330/023* (2013.01); *G09G 2354/00* (2013.01); *G09G 2370/02* (2013.01); *G09G 2380/14* (2013.01)

(58) Field of Classification Search
CPC .......... G06F 3/1423–1446; G09G 2300/023
See application file for complete search history.

(56) References Cited

U.S. PATENT DOCUMENTS

| | | | | |
|---|---|---|---|---|
| 8,144,074 B2* | 3/2012 | Nose | ........... | G09G 3/3611 345/1.1 |
| 8,548,528 B2* | 10/2013 | Kim | ........... | G06F 1/1626 455/566 |
| 8,760,363 B2 | 6/2014 | Lin et al. | | |
| 8,832,574 B2* | 9/2014 | Ostergard | ........... | G02B 26/005 715/768 |
| 8,884,844 B2* | 11/2014 | Yang | ........... | G06F 1/1647 345/156 |
| 8,943,427 B2* | 1/2015 | Heo | ........... | G06F 1/1647 715/768 |

(Continued)

OTHER PUBLICATIONS

Neil Hughes, "Apple Exploring Hybrid e-link-LCD Displays with Independent Regions", Apr. 7, 2011. http://appleinsider.com/articles/11/04/07/apple_exploring_hybrid_e_ink_lcd_displays_with_independent_regions.

*Primary Examiner* — Gene W Lee
(74) *Attorney, Agent, or Firm* — John L. Rogitz; John M. Rogitz

(57) ABSTRACT

In one aspect, a device includes a processor, a video display accessible to the processor, an electronic ink (e-ink) layer accessible to the processor and disposed on the device in a plane parallel to a plane established by the video display, at least one sensor accessible to the processor, and storage accessible to the processor. The storage bears instructions executable by the processor to execute an application and, based on input from the at least one sensor, determine whether to present content associated with the application using one or more of the e-ink layer and the video display.

20 Claims, 7 Drawing Sheets

(56) References Cited

U.S. PATENT DOCUMENTS

| | | | | |
|---|---|---|---|---|
| 9,196,190 B2* | 11/2015 | Liu | ............... | G09G 3/2092 |
| 2005/0210417 A1* | 9/2005 | Marvit | ............... | G06F 1/1613 |
| | | | | 715/863 |
| 2007/0234208 A1* | 10/2007 | Scott | ............... | H04M 1/22 |
| | | | | 715/700 |
| 2008/0072163 A1* | 3/2008 | Teng | ............... | G06F 1/1616 |
| | | | | 715/761 |
| 2008/0238828 A1* | 10/2008 | Nakayama | ............... | G09F 9/35 |
| | | | | 345/76 |
| 2010/0302194 A1* | 12/2010 | Park | ............... | G06F 1/1675 |
| | | | | 345/173 |
| 2011/0124376 A1* | 5/2011 | Kim | ............... | G06F 1/1626 |
| | | | | 455/566 |
| 2011/0228155 A1* | 9/2011 | Lee | ............... | A45D 42/00 |
| | | | | 348/333.01 |
| 2012/0157114 A1* | 6/2012 | Alameh | ............... | H04M 1/605 |
| | | | | 455/456.1 |
| 2013/0155092 A1* | 6/2013 | Chuang | ............... | G09G 3/344 |
| | | | | 345/589 |
| 2013/0169512 A1* | 7/2013 | Yang | ............... | G09G 3/3208 |
| | | | | 345/5 |
| 2014/0285498 A1* | 9/2014 | Kim | ............... | G06F 1/1601 |
| | | | | 345/501 |
| 2015/0228217 A1* | 8/2015 | Perdices-Gonzalez | ............... | |
| | | | | G09G 3/348 |
| | | | | 345/5 |
| 2016/0162242 A1* | 6/2016 | Xiong | ............... | G06F 3/1431 |
| | | | | 345/5 |

* cited by examiner

SYSTEMS AND METHODS FOR DETERMINING WHETHER TO PRESENT CONTENT USING ELECTRONIC PAPER DISPLAY

FIELD

The present application relates generally to systems and methods for determining whether to present content using an electronic paper display.

BACKGROUND

In modern electronics, video displays often consume a relatively large amount of battery power of the respective devices in which they are disposed. This can lead to these devices draining their battery power much faster than desired, and in turn to the devices being sometimes unavailable for use due to a lack of adequate battery power. As recognized herein, there are currently no adequate solutions to the foregoing computer-related problem.

SUMMARY

Accordingly, in one aspect a device includes a processor, a video display accessible to the processor, an electronic ink (e-ink) layer accessible to the processor and disposed on the device in a plane parallel to a plane established by the video display, at least one sensor accessible to the processor, and storage accessible to the processor. The storage bears instructions executable by the processor to execute an application and, based on input from the at least one sensor, determine whether to present content associated with the application using one or more of the e-ink layer and the video display.

In another aspect, a method includes receiving input from at least one sensor on a device and determining, based on input from the at least one sensor, whether to present content using one or more of an electronic ink (e-ink) display and a video display.

In still another aspect, a device includes a processor, a video display accessible to the processor, an electronic paper display accessible to the processor, at least one sensor accessible to the processor, and storage accessible to the processor. The storage bears instructions executable by the processor to present at least first content using the video display and receive input from the at least one sensor. The instructions are also executable by the processor to, based on the input from the at least one sensor, determine whether to present at least second content using the electronic paper display.

The details of present principles, both as to their structure and operation, can best be understood in reference to the accompanying drawings, in which like reference numerals refer to like parts, and in which:

DETAILED DESCRIPTION

Figure 1:
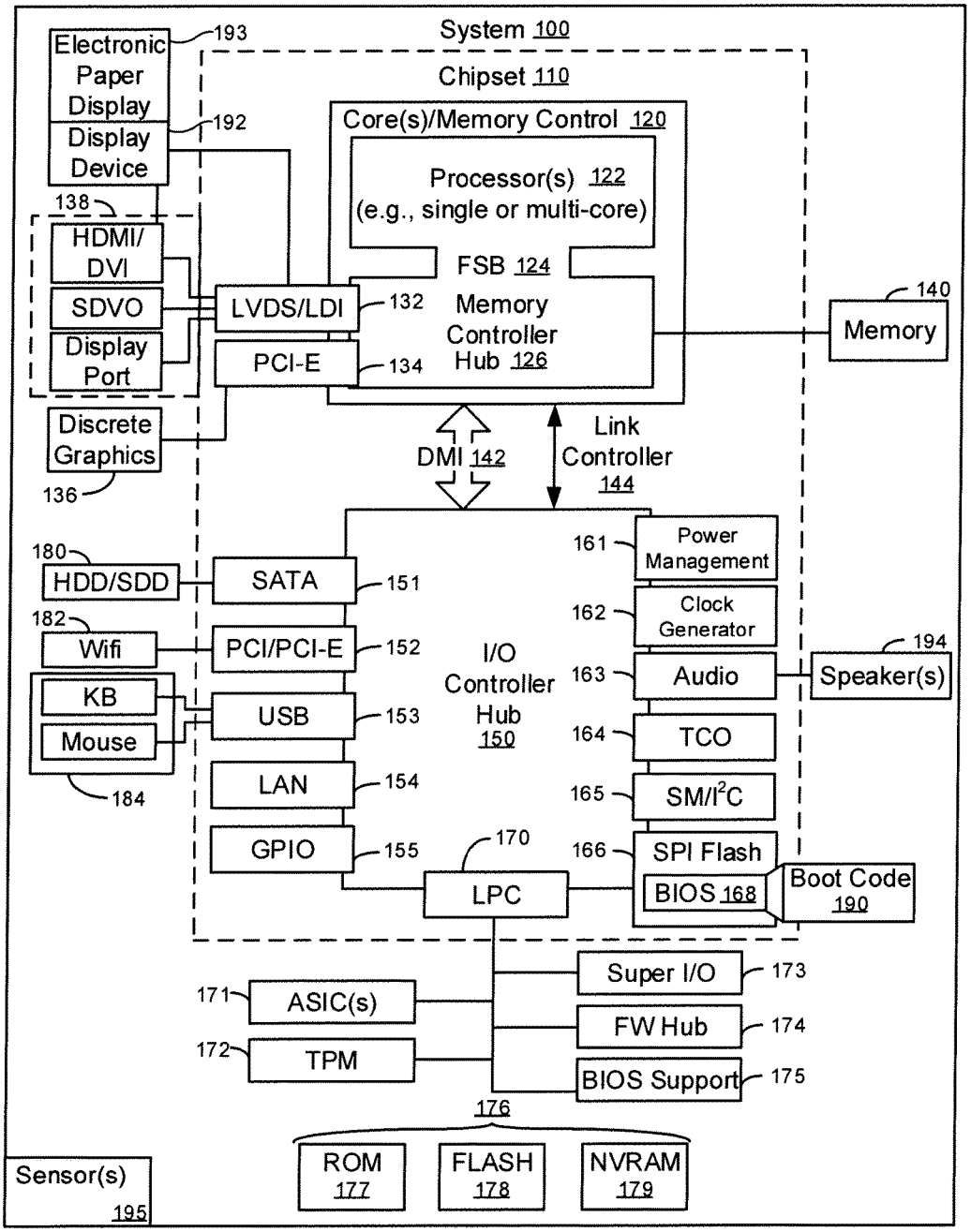
FIGS. 1 and 3 are block diagrams of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a video display device 192 (e.g., a CRT, a flat panel, a touch-enabled display, a liquid crystal display (LCD), a light emitting diode (LED) display, an organic light emitting diode display (OLED), a plasma display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still in reference to the system 100 and referring back to the display device 192, it may be a video display such as any of the types listed above, such as an LED display, an LED segment display, an OLED display, an LCD display, a plasma display, etc. Thus, in some embodiments the display device 192 may also have one or more backlights associated therewith for providing backlight for the system 100 to present content using the display device 192.

Furthermore, adjacent to the display device 192 on the system 100 may be at least one electronic paper display and/or an electronic ink (e-ink) display 193 such as one manufacturer by E Ink Corporation, one using electrophoretic technology, one using electrowetting technology, etc. For instance, the e-ink display 193 may be formed at least in part by a microencapsulated electrophoretic display, and may be a grayscale and/or color e-ink display.

In some embodiments, the display 193 may form a film or layer that is disposed over the display device 192 relative to a surface of the display device 192 facing away from the system 100. Further, the display 193 may be disposed along a plane parallel to a plane established by this surface of the display device 192. An example of this is shown in FIG. 3.

Figure 3:
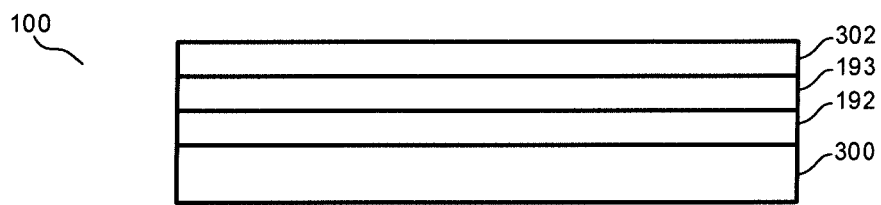

FIG. 3 shows, in side elevational view, an example embodiment of the system 100 as a tablet computing device. As may be appreciated from FIG. 3, the system 100 may include system components 300 such as the processor 122, drives 180, RAM 140, etc. The display device 192 may be juxtaposed underneath the e-ink display 193, and in some embodiments the e-ink display 193 may be juxtaposed underneath a touch sensor, touch panel, and/or digitizer 302 that senses touch input and provides input related thereto to the processor 122. Notwithstanding, the touch sensor 302 may be juxtaposed elsewhere, such as between the layers of the display 193 and display 192. In some embodiments, it may even form a part of the display 192.

The display 193 may be selectively controllable by the processor 122 to present content in some or all of a display area of the device 193. The display 193 may also be controllable by the processor 122 to not present content on at least a portion thereof and to be transparent at that portion so that light from the display device 192 may pass through the portion for viewing by a user.

Referring back to FIG. 1, in addition to the touch sensor 302 described above, the system 100 may include one or more other sensors 195. The sensors 195 may include other touch sensors, such as sensors distributed along exterior portions of the housing of the system 100 to sense a user touching the system 100 while, for example, holding it in his or her hand. The sensors 195 may also include motion sensors such as a gyroscope that senses and/or measures the orientation of the system 100 and provides input related thereto to the processor 122, as well as an accelerometer that senses acceleration and/or movement of the system 100 and provides input related thereto to the processor 122.

Other examples of sensors 195 that may be included on the system 100 for use in accordance with present principles include an audio receiver/microphone that provides input from the microphone to the processor 122 based on audio that is detected, such as via a user providing audible input to the microphone. As another example, the sensor(s) 195 may be a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

Still in reference to FIG. 1, and though not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
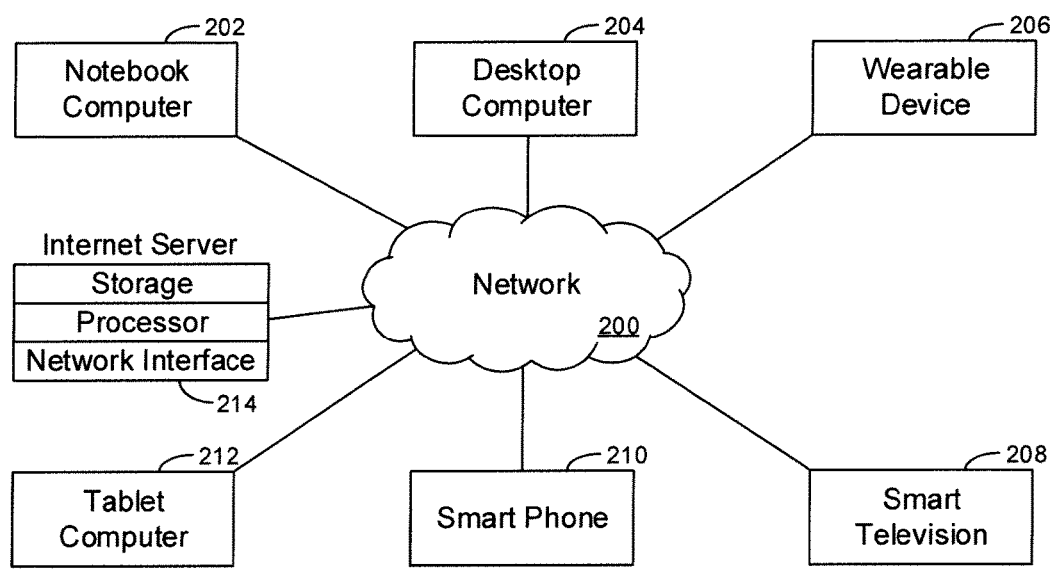
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 4:
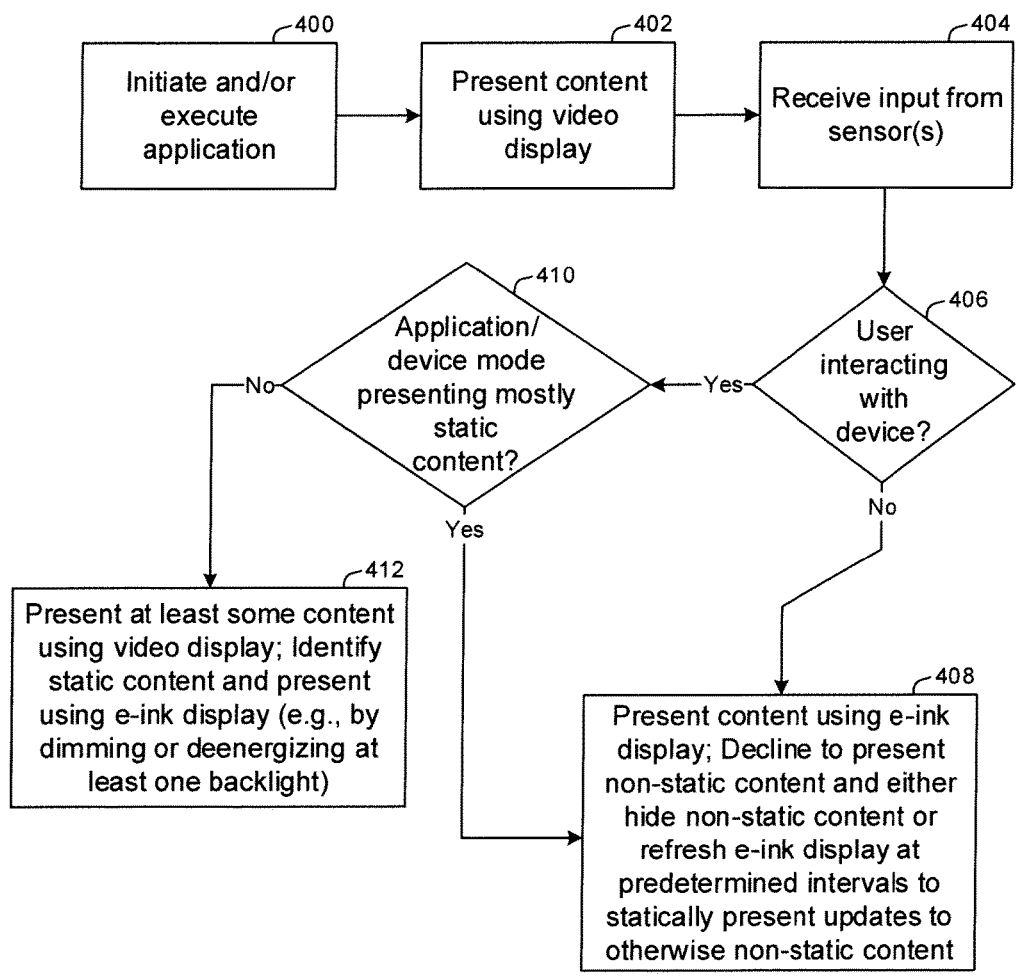
FIG. 4 is a flow chart of an example algorithm in accordance with present principles.

Referring to FIG. 4, it shows example logic that may be executed by a device such as the system 100 (referred to when describing FIG. 4 as the "present device") for determining whether to present at least a portion of content using an electronic paper display overlaid on or disposed adjacent to a video display in accordance with present principles. Beginning at block 400, the present device initiates and/or executes an application at the present device, such as a telephone application executable to conduct a telephone call and present content related thereto, a video player application executable to play audio video content, a web browser application executable to present web pages, an email application executable to present emails, a gaming application executable to conduct a game and present content related thereto, etc. It is to be understood that the present logic may be executed specifically by the application that is initiated and/or executed at block 400, and/or the logic may be executed by the present device itself using other software.

From block 400 the present device proceeds to block 402. At block 402 the present device presents content using a video display on the present device, and/or presents content using an electronic paper display and/or electronic ink display on the present device (collectively referred to below as an "e-ink display" for simplicity). It is to be understood that the content presented at block 402 may be associated with the application executed at block 400. Thus, the content may be, for example, audio video content such as a television show or Internet video. As other examples, the content may also be a user interface presenting information associated with a telephone call that is being conducted using the present device or a user interface associated with a game application for playing a game.

From block 402 the present device may move to block 404. At block 404 the present device may receive input from one or more sensors in communication with and/or disposed on the present device. The sensors may include any of those described above in reference to the sensors 195. Thus, for example, input may be received from a touch-enabled display, from another touch sensor, from a motion sensor such as an accelerometer or a gyroscope, from a microphone, and from a camera.

From block 404 and responsive to receipt of the input from the sensor(s) at block 404, the present device may move to decision diamond 406. At diamond 406 the present device may determine, based on the input received at block 404, whether a user is interacting with the device.

For example, if the input received at block 404 was input from a motion sensor, at diamond 406 the present device may determine whether the present device is moving or not based on input from the motion sensor indicative of movement of the present device or a lack thereof. Then, based at least in part on whether the device is moving, the present device may present at least a portion of the content associated with the application using the video display or the e-ink display. Thus, e.g., if the present device identifies motion of the present device based on the input received at block 404, the present device may determine that a user is interacting with the device (rather than the device laying still on a table, for instance), whereas if the present device does not identify motion of the present device the present device may determine that a user is not interacting with the device. Furthermore, note that in some embodiments the determination made at diamond 406 may not be based on whether the device is moving per se, but based on whether device movement is above a movement threshold.

As another example, if the input received at block 404 was input from a touch sensor, at diamond 406 the present device may determine whether the present device is being touched based on input from the touch sensor indicative of contact with a person or a lack thereof. Then, based at least in part on whether the device is being touched, the present device may present at least a portion of the content associated with the application using the video display or the e-ink display. Thus, e.g., if the present device identifies that the present device is being touched based on the input received at block 404 (such as user input selecting keys of a virtual keyboard presented on the display to type message, or selecting selector presented on the display), the present device may determine that a user is interacting with the device. However, if the present device does not identify that the present device is being touched the present device may determine that a user is not interacting with the device. Furthermore, note that in some embodiments the determination made at diamond 406 may not be based on whether the device is being touched per se, but based on whether at least a threshold area of the device is being touched and/or whether the device is being touched at particular predefined locations (such as where a user may typically hold the present device to engage in a telephone call).

Still other ways of determining whether a user is interacting with the present device may be used. For example, input from a camera may be used to determine, using eye tracking software, whether a user is looking at the present device. If the present device determines that the user is looking at the device or is otherwise providing eye input to the present device, an affirmative determination may be made at diamond 406.

As another example, input from a microphone may be used to determine, using voice recognition software, whether a user is providing audible input to the present device. If the present device determines that the user is providing audible input to the device or is otherwise providing input to the microphone, an affirmative determination may be made at diamond 406.

An affirmative determination at diamond 406 may cause the present device to proceed to decision diamond 410, which will be described shortly. However, first note that if a negative determination is made at diamond 406, the present device may instead proceed to block 408. At block 408 the present device may present some if not all of the content associated with the application being executed using the present device's e-ink display, and decline to present non-static content.

Thus, it is to be understood that the present device may identify any non-static content also at block 408. The present device may identify particular portions of the content as being non-static based on data received from the application being executed that indicates that portions of the content that are non-static. The present device may also do so by monitoring the content as it is presented to identify content regions that move or change at least within threshold time, and/or determining that content regions to be presented will move or change within at least a threshold time. Still further, the present device may do so by monitoring the content as it is presented to identify regions of the video display that present content that changes at least within a threshold time (e.g., by monitoring pixels to identify when their output changes or monitoring the present device's processor to identify when it controls pixels to change). The present device may also do so by determining that display regions to be used to present particular portions of the content will present different portions of the content within at least a threshold time as determined by the present device (e.g., using metadata associated with the content or by parsing the content itself).

Still in reference to block 408, in addition to identifying and declining to present non-static content, the present device may also hide or otherwise not present the non-static content, or the present device may refresh the e-ink display at predetermined intervals (e.g., established by a user or the manufacturer of the device) to statically present updates to the non-static content.

Referring back to diamond 406, as indicated above an affirmative determination may cause the present device to proceed to decision diamond 410. At diamond 410 the present device may determine whether the application being executed is presenting mostly if not all static content, and/or may determine whether the device is otherwise in a mode for presenting mostly if not all static content. The present device may make this determination, for example, based on data received from the application being executed that indicates whether portions of the content that are static are or will be presented, and/or how much static content is or will be presented.

The present device may also do so by monitoring the content as it is presented to identify content regions that do not move or change for at least a threshold time, and/or determining that content regions to be presented will not move or change for at least a threshold time. Still further, the present device may do so by monitoring the content as it is presented to identify regions of the video display that present the same portion(s) of unchanging content for at least a threshold time (e.g., by monitoring pixels to identify if their output changes or monitoring the present device's processor to identify if it controls pixels to change). The device may also do so by determining that display regions to be used to present particular portions of the content will present the same portions of the content without the content scheduled to change for at least a threshold time as determined by the present device (e.g., using metadata associated with the content or by parsing the content itself).

Once static content is identified, the present device may determine whether the application or device mode is presenting mostly static content at diamond 410 by determining whether the static content that is identified constitutes at least at threshold amount of all content that is to be presented at a particular video display region, that is to be presented within a given image frame, and/or that is to be presented within a given time frame. Further, in some embodiments the application or device mode may simply provide data indicating that mostly static content is being presented or will be presented. Examples of device modes including a telephone mode in which a telephonic communication may be conducted, an e-reader mode in which the present device is used as en electronic reader, and a video mode in which audio video content is presented.

In any case, an affirmative determination at diamond 410 may cause the present device to proceed to block 408 and undertake actions thereat as described above. If a negative determination is made at diamond 410, the present device may instead move to block 412. At block 412 the present device may present at least a portion of the content, if not all the content, using the video display. Thus, it is to be understood that in some embodiments at block 412, the present device may use the video display to present all the content.

In other embodiments at block 412, the present device may identify static content as described herein and/or video display regions that would otherwise present static content. The present device may then present the static content using regions of the e-ink display disposed over regions of the video display that would otherwise present the static content. Thus, a user may perceive content presented at the present device as if the content is not presented using two separate displays owing to the e-ink display presenting certain portions of the content, and the video display underneath the e-ink display presenting other portions of the content through other portions of the e-ink display that are not presenting content and that are transparent. This may occur based on those other portions of the e-ink display not being controlled to present content but rather being controlled by the present device to be transparent.

As for portions of the e-ink display presenting static content, one or more backlights for portions of the video display that would otherwise present the static content that are underneath the portions of the e-ink display presenting the static content may be dimmed, deenergized or otherwise powered off to save power that would otherwise be consumed by the present device to power the backlight.

Figure 5:
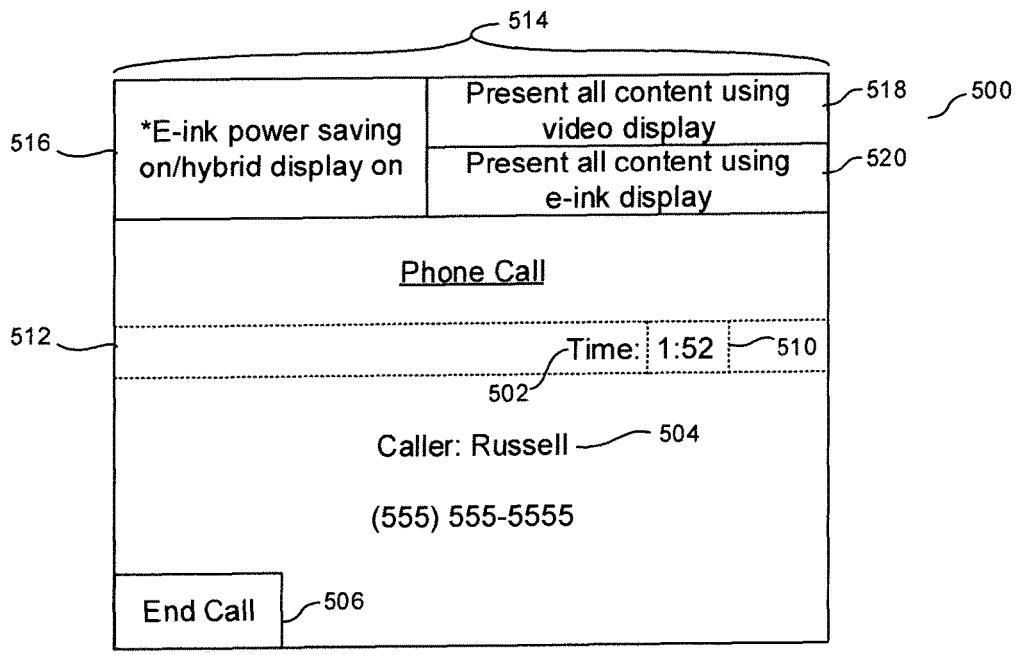
FIGS. 5-8 are example user interfaces (UI) in accordance with present principles.
Figure 6:
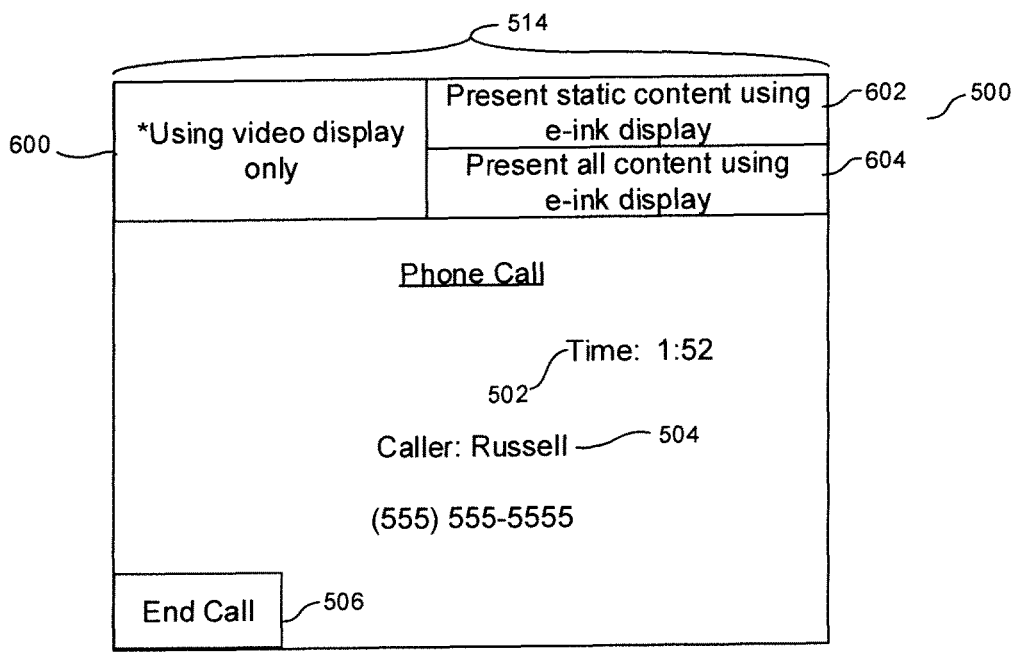
Figure 7:
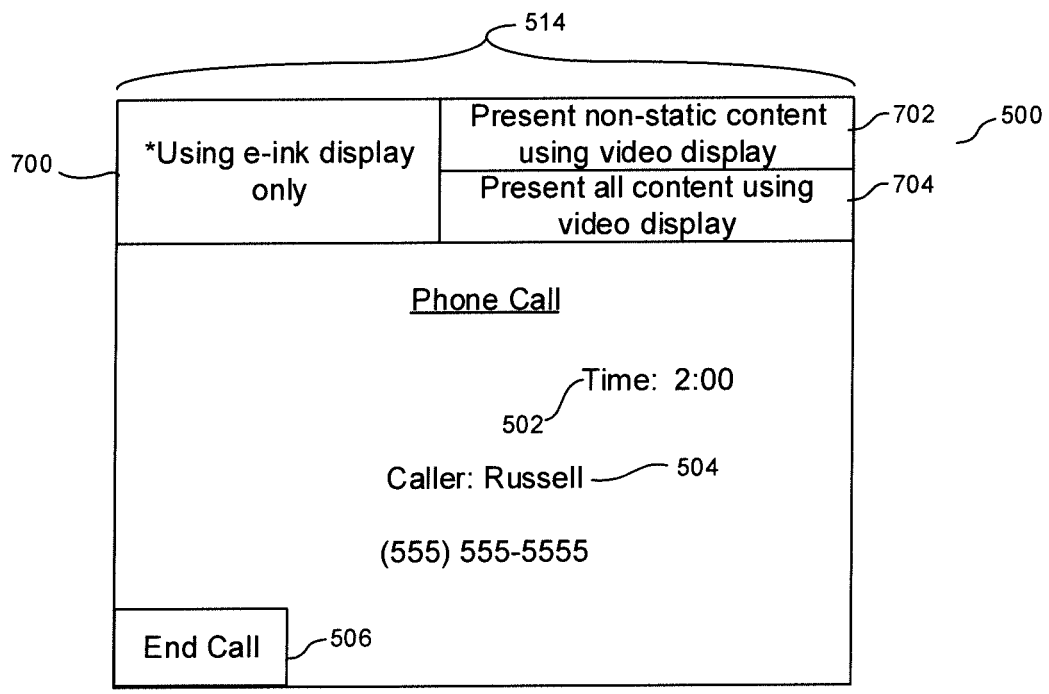

Continuing the detailed description in reference to FIGS. 5-7, they show an example user interface (UI) 500 presentable at a device using one or both of a video display and an e-ink display on the device. It is to be understood that the UI 500 is associated with a telephone application. Thus, the UI 500 has a timer 502 that indicates a length of a telephone call being engaged in, as well as a caller identification 504 indicating a name and telephone number associated with a person on the other end of the line. An end call selector 506 is also shown that is selectable to end the telephone call.

With specific reference to FIG. 5, it is to be understood that the content of the UI 500 as shown in this figure may be presented using both an e-ink display and a video display underneath the e-ink display. Portions other than the content associated with the timer 502 may be presented using the e-ink display based on a determination that those portions of the content of the UI 500 will not change for at least a threshold time and/or for the duration of the phone call.

Note that a first box 510, which is not actually presented as part of the content but is shown for illustration, delineates an area of the UI 500 that is to be presented using the device's video display. For example, if the video display is an OLED display, individual pixels of the OLED may be controlled by the device to, in real time, show the timer as it changes to indicate the length of the telephone call. Thus, in some embodiments, the OLED may be controlled to present the content in the UI region inside the box 510. However, in other embodiments the OLED may be controlled to present only the timer digits themselves as they change so that only pixels presenting the timer digits at a given time are illuminated while the device controls the e-ink display to present other portions of the UI 500 even within the box 510.

A second box 512 is also shown. This box is also not actually presented as part of the content but is shown for illustration, and delineates an area of the UI 500 that is to be presented using the device's video display when the video display is, for example, an LED display with associated backlights that are disposed horizontally relative to the perspective shown and controlled to illuminate the video display to present content. Thus, the entire region of the UI 500 delineated by the box 512 may be a portion of the content presented using the video display and a backlight underneath the area delineated by the box 512 (while portions of the UI 500 outside the box 512 are presented using the device's e-ink display and by turning off other backlights under those portions) so that the timer can be updated in real time as the telephone call transpires while power is saved by using the e-ink display to present other portions of the UI 500 outside the box 512.

Referring again to all of FIGS. 5-7, the UI 500 may also have a region 514 that may dynamically change based on whether both the e-ink display and the video display are being used to present the UI 500 as shown in FIG. 5, whether the video display only is being used to present the UI 500 as shown in FIG. 6, and whether the e-ink display only is being used to present the UI 500 as shown in FIG. 7.

Describing the region 514 as shown in FIG. 5, an indication 516 may be presented conveying information that both the e-ink display and video display of the device are being used. For example, this indication may be in the form of an indication that "e-ink power saving is on" and/or that a "hybrid display" feature is on in which the e-ink display and the video display are both used to present the UI 500.

The region 514 as shown in FIG. 5 may also include a selector 518 that is selectable to provide input to the device causing the device to present content of the UI 500 using the video display only. The region 514 may further include a selector 520 that is selectable to provide input to the device causing the device to present content of the UI 500 using the e-ink display only.

Describing the region 514 as shown in FIG. 6, an indication 600 may be presented conveying information that only the video display of the device is being used. For example, this indication may be in the form of an indication that the device is "using video display only" to present the UI 500.

The region 514 as shown in FIG. 6 may also include a selector 602 that is selectable to provide input to the device causing the device to present content determined to be static using the device's e-ink display while continuing to present non-static portions of the content using the video display. The region 514 may further include a selector 604 that is selectable to provide input to the device causing the device to present content of the UI 500 using the e-ink display only.

Describing the region 514 as shown in FIG. 7, an indication 700 may be presented conveying information that only the e-ink display of the device is being used. For example, this indication may be in the form of an indication that the device is "using e-ink display only" to present the UI 500.

The region 514 as shown in FIG. 7 may also include a selector 702 that is selectable to provide input to the device causing the device to present content determined to be non-static using the device's video display while continuing to present static portions of the content using the e-ink display. The region 514 may further include a selector 704 that is selectable to provide input to the device causing the device to present content of the UI 500 using the video display only.

Note that the selectors described above in reference to the region 514 of FIGS. 5-7, and indeed other portions of the UI 500, may be selectable using a touch sensor or touch panel for sensing the selection input in any of the three display modes described in reference to these figures. Thus, the touch sensor or panel may form part of the device's video display, and/or may otherwise be juxtaposed with the e-ink display and video display to receive input to touched portions of the content as it is presented using one or both of the e-ink display and the video display.

Further describing FIG. 7, it is noted that the timer 502 indicates a call time of 2:00 even though the timer 502 as shown in FIGS. 5 and 6 indicates an actual call time of 1:52. FIG. 7 thus shows that while only the e-ink display is being used to present the UI 500, and even though the actual call time is 1:52, the e-ink display may be refreshed at predetermined time increments (such as every fifteen or thirty seconds) to reflect times close the actual time and/or to reflect an actual time of the telephone call as determined at the time of the refresh. For instance, every thirty seconds the device may round up or down from the actual call time to a predetermined time increment (e.g., to a nearest half minute) to refresh the static timer with an updated time.

Figure 8:
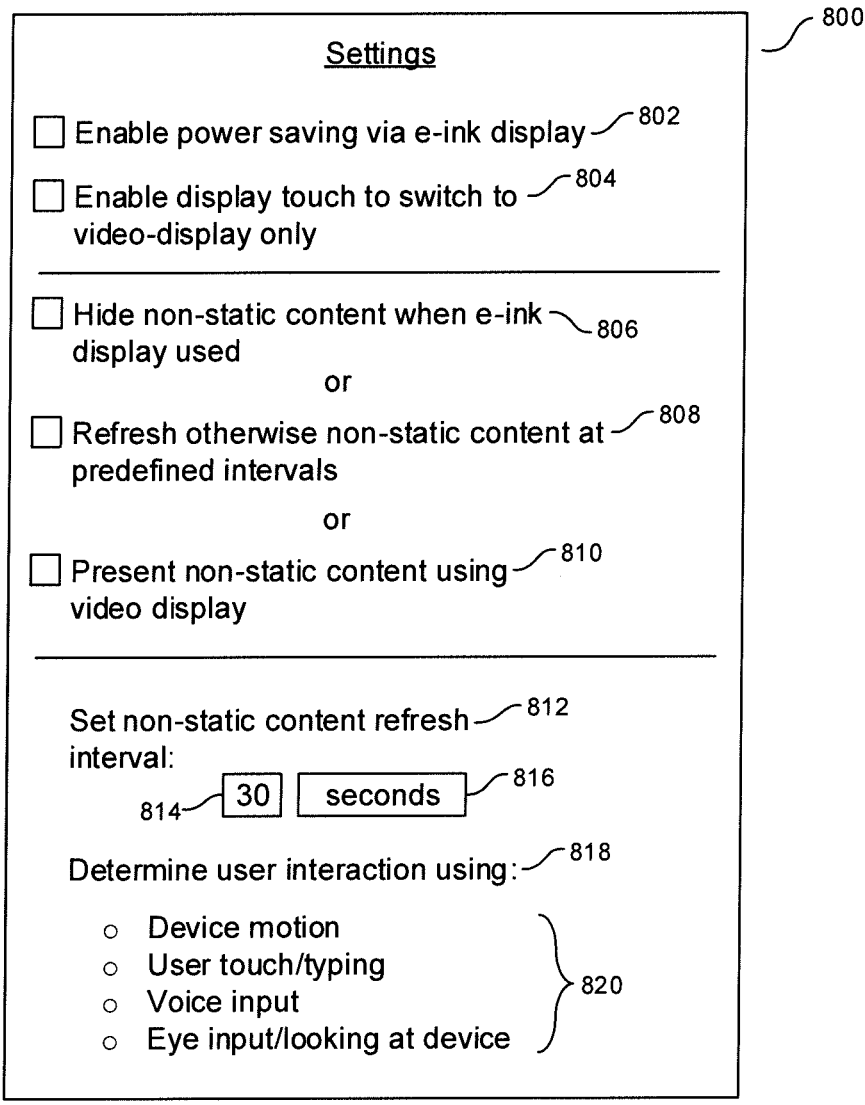

Before moving on to the description of FIG. 8, it is to be understood in reference to FIGS. 5-7 that in addition to or in lieu of the example indications 516, 600, and 700, one or more light emitting diodes (LEDs) on the device may be actuated to emit light of different respective colors for each of the indications and/or emit light at different respective patterns for each of the indications to thus indicate, via the LED(s), whether a hybrid display feature is being used, whether only the video display is being used, or whether only the e-ink display is being used.

Now in reference to FIG. 8, it shows an example UI 800 presentable at a device undertaking present principles to configure settings of the device for presenting content using one or both of its e-ink display and its video display. The UI 800 may include a first option 802 enableable using the respective check box shown adjacent thereto to enable "power saving" by selectively using an e-ink display for presenting static content while using a video display to present non-static content as disclosed herein.

The UI 800 may also include a second option 804 enableable using the respective check box shown adjacent thereto to enable a feature in which a user's touch or contact with the device (and more specifically, e.g., a touch or contact with the exterior of the display portion of the device used for presenting content) may be identified and then, responsive to this identification, the device may switch to presenting content using only the video display. The switch may be from using the e-ink display to present a portion of content while using the video display to present another portion, or from using the e-ink display only to present content.

The UI 800 may also include options 806, 808, and 810 that are respectively enableable using the respective check box shown adjacent to each option. The option 806 may be enabled to configure the device to hide or otherwise not present content determined to be non-static while an e-ink display is being controlled by the device to present content. The option 808 may be enabled to configure the device to periodically refresh content determined to be non-static at predefined intervals while an e-ink display is being controlled by the device to present content. The option 810 may be enabled to configure the device to present static content using the e-ink display and to present non-static content using the video display.

Even further, in some embodiments the UI 800 may include an option 812 for a user to establish the predefined interval referenced in the paragraph above. Thus, a number entry box 814 is presented at which a user may enter a number, and an increment entry box 816 is also presented at which a user may select a time increment to associate with the number. In the example shown, a user has selected thirty seconds as the predefined interval.

Still in reference to the UI 800, in some embodiments it may include another option 818 at which a user may select one or more types 820 of methods or ways for the device to determine whether the user is interacting with it. Each one is selectable using the respective radio button presented adjacent thereto. They types 820 may include using device motion, using touch identification and/or identification of the user typing, using voice input, and using eye input and/or identification of the user as looking at the device.

Though not shown in FIG. 8, it is to be understood that in some embodiments the UI 800 may include an option for selecting one or more applications and/or modes for which the e-ink display and video display combination should be used for presenting content when possible to conserve power as disclosed herein. The UI 800 may also include an option for selecting one or more applications and/or modes for which the e-ink display only should be used for presenting content, as well as an option for selecting one or more applications and/or modes for which the video display only should be used for presenting content. For example, when a video player application is executed to present audio video content, a user may wish that the video display only be used to present the audio video content so that even if the device determines that a user is not touching or moving the device or otherwise interacting with the device, the e-ink display will not be used to present individual frames of the video content but rather the video display will be used to present the video content.

Furthermore, it is to be understood that in some embodiments the application itself, such as the video player application, may control the e-ink display and video display to present content using only the video display based on identification that mostly non-static content is to be presented (e.g., even when a determination is made that the user is not interacting with the device).

As another example, if the application is a game application that presents mostly static content that should only be refreshed sporadically, such as a Scrabble game, the game application may control the e-ink display and the video display to present content using only the e-ink display (e.g., even when a determination is made that the user is interacting with the device).

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a video display accessible to the at least one processor;
   an electronic ink (e-ink) layer disposed on the device in a plane parallel to a plane established by the video display, the e-ink layer being accessible to the at least one processor; and
   storage accessible to the at least one processor and bearing instructions executable by the at least one processor to:
   control the e-ink layer to present a first portion of first content;
   concurrent with controlling the e-ink layer to present the first portion, control the video display to present a second portion of the first content that is not presented using the e-ink layer; and
   present a graphical user interface (GUI) on one or more of the video display and the e-ink layer, the GUI comprising a setting that is selectable by a user to enable the device to present different contents from different applications using both the video display and the e-ink layer, wherein based on a single selection of the setting different portions of content from a first application of the different applications are concurrently presented at a first time using both the video display and the e-ink layer, and wherein based on the single selection of the setting different portions of content from a second application of the different applications are concurrently presented at a second time using both the video display and the e-ink layer, the first time being different from the second time.

2. The device of claim 1, comprising at least one sensor accessible to the at least one processor, wherein the at least one sensor comprises a camera, and wherein the instructions are executable by the at least one processor to:
   based on input from the camera, determine that a user is not looking at the device and, responsive to the determination that the user is not looking at the device, present at least the first portion of the first content using the e-ink layer.

3. The device of claim 1, wherein the instructions are executable by the at least one processor to:
   responsive to determining that mostly static content is to be presented, control the e-ink layer to present the static content and control the video display to not present content.

4. The device of claim 1, wherein the setting is a first setting, and wherein the GUI comprises a second setting that is selectable to enable the device to switch to presenting any given visual content using only the video display responsive to a user touching the device.

5. The device of claim 1, wherein the setting is a first setting, and wherein the GUI comprises a second setting that is selectable to enable the device to hide non-static visual content from presentation while the e-ink layer is used to present content.

6. The device of claim 1, wherein the setting is a first setting, and wherein the GUI comprises a second setting that is user-configurable to establish an interval at which content presented using the e-ink layer is refreshed.

7. A method, comprising:
   controlling an electronic ink (e-ink) display of a device to present a first portion of first content; and
   controlling, concurrent with controlling the e-ink display to present the first portion, a video display of the device to present a second portion of the first content; and
   presenting a graphical user interface (GUI) on one or more of the video display and the e-ink display, the GUI comprising a setting that is selectable by a user to enable the device to present different contents from different applications using both the video display and the e-ink display, wherein based on a single selection of the setting different portions of content from a first application of the different applications are concurrently presented at a first time using both the video display and the e-ink display, and wherein based on the single selection of the setting different portions of content from a second application of the different applications are concurrently presented at a second time using both the video display and the e-ink display, the first time being different from the second time.

8. The method of claim 7, wherein the device comprises a motion sensor, and wherein the method comprises:
   identifying, based on input from the motion sensor, whether the device is moving; and
   presenting, based on the identifying, the first content using one or more of the e-ink display and the video display.

9. The method of claim 7, wherein the second portion of the first content is not presented using the e-ink display.

10. The method of claim 7, comprising:
    presenting a selector using one or more of the e-ink display and the video display, the selector being selectable to switch to presenting the content using the e-ink display but not the video display.

11. The method of claim 7, comprising:
    presenting a selector using one or more of the e-ink display and the video display, the selector being selectable to switch to presenting the content using the video display but not the e-ink display.

12. The method of claim 7, wherein the setting is a first setting, and wherein the GUI comprises a second setting that is selectable to enable the device to switch to presenting any given visual content using only the video display responsive to a user touching the device.

13. The method of claim 7, wherein the setting is a first setting, and wherein the GUI comprises a second setting that is selectable to enable the device to hide non-static visual content from presentation while the e-ink display is used to present content.

14. The method of claim 7, wherein the setting is a first setting, and wherein the GUI comprises a second setting that is user-configurable to establish an interval at which content presented using the e-ink display is refreshed.

15. A device, comprising:
   at least one processor;
   a video display accessible to the at least one processor;
   an electronic paper display accessible to the at least one processor; and
   storage accessible to the at least one processor and bearing instructions executable by the at least one processor to:
   present at least first content using the electronic paper display;
   concurrent with presentation of the first content using the electronic paper display, present at least second content using the video display; and
   present a graphical user interface (GUI) on one or more of the video display and the electronic paper display, the GUI comprising a setting that is selectable by a user to enable the device to present different contents from different applications using both the video display and the electronic paper display, wherein based on a single selection of the setting different portions of content from a first application of the different applications are concurrently presented at a first time using both the video display and the electronic paper display, and wherein based on the single selection of the setting different portions of content from a second application of the different applications are concurrently presented at a second time using both the video display and the electronic paper display, the first time being different from the second time.

16. The device of claim 15, wherein the setting is a first setting, and wherein the GUI comprises a second setting that is selectable to enable the device to switch to presenting any given visual content using only the video display responsive to a user touching the device.

17. The device of claim 15, wherein the setting is a first setting, and wherein the GUI comprises a second setting that is selectable to enable the device to hide non-static visual content from presentation while the electronic paper display is used to present content.

18. The device of claim 15, wherein the setting is a first setting, and wherein the GUI comprises a second setting that is user-configurable to establish an interval at which content presented using the electronic paper display is refreshed.

19. The device of claim 15, wherein the device comprises one or more light emitting diodes (LEDs) accessible to the at least one processor, and wherein the instructions are executable to:
   while concurrently presenting the first content using the electronic paper display and the second content using the video display, illuminate one or more of the one or more LEDs in a first color to indicate that both the electronic paper display and the video display are currently being used to present visual content, the instructions also being executable to, while visual content is presented using only the electronic paper display, illuminate one or more of the one or more LEDs in a second color different from the first color to indicate that only the electronic paper display is currently being used to present visual content.

20. The device of claim 19, wherein the instructions are executable by the at least one processor to:
   while visual content is presented using only the video display, illuminate one or more of the one or more LEDs in a third color different from the first and second colors to indicate that only the video display is currently being used to present visual content.

* * * * *